US012618492B2

(12) United States Patent
Morris

(10) Patent No.: US 12,618,492 B2
(45) Date of Patent: May 5, 2026

(54) CONDUIT ALIGNMENT TOOLS AND METHODS

(71) Applicant: Pipe-Pal Holdings Inc., Chilliwack (CA)

(72) Inventor: Ryan Morris, Chilliwack (CA)

(73) Assignee: Pipe-Pal Holdings Inc., Chilliwack (CA)

( * ) Notice: Subject to any disclaimer, the term of this patent is extended or adjusted under 35 U.S.C. 154(b) by 0 days.

(21) Appl. No.: 18/261,239

(22) PCT Filed: Jan. 20, 2022

(86) PCT No.: PCT/CA2022/050084

§ 371 (c)(1),
(2) Date: Jul. 12, 2023

(87) PCT Pub. No.: WO2022/155744

PCT Pub. Date: Jul. 28, 2022

(65) Prior Publication Data

US 2024/0068599 A1    Feb. 29, 2024

Related U.S. Application Data

(60) Provisional application No. 63/140,699, filed on Jan. 22, 2021.

(51) Int. Cl.
*F16L 3/12* (2006.01)
(52) U.S. Cl.
CPC ................................. *F16L 3/1218* (2013.01)

(58) Field of Classification Search
CPC .. H02G 1/06; H02G 9/06; H02G 3/32; H02G 3/305; F16L 3/227; F16L 1/06
See application file for complete search history.

(56) References Cited

U.S. PATENT DOCUMENTS

| | | | | |
|---|---|---|---|---|
| 3,737,131 A | * | 6/1973 | Larson | A47F 5/0823 211/70.6 |
| 3,854,684 A | * | 12/1974 | Moore | F16L 3/227 174/157 |
| 5,448,012 A | | 9/1995 | Jacob | |
| 5,593,115 A | * | 1/1997 | Lewis | F16L 3/227 248/200.1 |

(Continued)

FOREIGN PATENT DOCUMENTS

| | | | |
|---|---|---|---|
| DE | 102014008946 A1 | | 12/2015 |
| JP | 3142363 U | * | 6/2008 |

(Continued)

*Primary Examiner* — Christopher Garft
(74) *Attorney, Agent, or Firm* — Todd A. Rattray; Oyen Wiggs Green & Mutala LLP

(57) ABSTRACT

Example embodiments of the described technology provide a conduit spacer tool for enforcing a minimum spacing between adjacent conduits. The conduit spacer tool may comprise a body comprising a pair of side arms, each side arm having an equal width. The body of the conduit spacer tool may comprise a slot defined by an inner surface of the side arms, the slot terminating at a groove of the body and the slot having a width for receiving a conduit. The width may be dimensioned to correspond to a designated conduit diameter. When the conduit is fully received in the slot, the conduit may have a centre located at a longitudinal centre of the body.

19 Claims, 14 Drawing Sheets

(56)     References Cited

U.S. PATENT DOCUMENTS

| | | | |
|---|---|---|---|
| 7,014,152 B2 | 3/2006 | Grendahl | |
| 7,942,371 B1 * | 5/2011 | McCoy .................... | H02G 9/02 |
| | | | 248/68.1 |
| 8,398,034 B2 | 3/2013 | Lambert et al. | |
| 9,206,927 B2 | 12/2015 | Carter et al. | |
| 9,472,937 B2 | 10/2016 | Klein | |
| 10,302,227 B1 | 5/2019 | Gustaveson, II | |
| 10,569,055 B1 * | 2/2020 | Sigsworth ............. | F16L 3/2235 |
| 2004/0056156 A1 * | 3/2004 | Dodson ................... | F16L 3/222 |
| | | | 248/68.1 |
| 2005/0077436 A1 * | 4/2005 | Nelson .................... | F16L 3/223 |
| | | | 248/68.1 |
| 2006/0284025 A1 * | 12/2006 | Faucher .................... | F16L 3/22 |
| | | | 248/58 |
| 2007/0235596 A1 * | 10/2007 | Youmans ................ | F16L 3/223 |
| | | | 248/68.1 |
| 2012/0009548 A1 * | 1/2012 | Feit ......................... | G09F 5/042 |
| | | | 434/95 |
| 2014/0259610 A1 * | 9/2014 | Vrame .................... | F16L 3/105 |
| | | | 248/62 |
| 2015/0351530 A1 * | 12/2015 | Udagawa ................. | F16L 3/26 |
| | | | 108/50.02 |

FOREIGN PATENT DOCUMENTS

| | | | |
|---|---|---|---|
| JP | 4986722 B2 | 7/2012 | |
| KR | 101876820 B1 | 7/2018 | |

* cited by examiner

CONDUIT ALIGNMENT TOOLS AND METHODS

CROSS-REFERENCE TO RELATED APPLICATIONS

This application claims priority from U.S. application No. 63/140,699 filed 22 Jan. 2021 and entitled CONDUIT ALIGNMENT TOOLS AND METHODS which is hereby incorporated herein by reference for all purposes. For purposes of the United States of America, this application claims the benefit under 35 U.S.C. § 119 of U.S. application No. 63/140,699 filed 22 Jan. 2021 entitled CONDUIT ALIGNMENT TOOLS AND METHODS.

TECHNICAL FIELD

This invention pertains to conduit installation tools. Particular embodiments of the invention relate to conduit installation systems which accommodate conduits of varying size.

BACKGROUND

Conduits are generally cylindrical tubes that are used to carry electrical wiring, liquids, gases, etc. in a wide variety of applications. The term "conduits" as used herein includes electrical conduits, plumbing tubing and pipes, gas lines and/or the like.

Electrical conduits are used to protect and route electrical wiring. Electrical conduits are made in standard sizes, usually with nominal dimensions in the range of ½ inch (about 13 mm) to 6 inches (about 150 mm). Electrical conduits are commonly made of metal, plastic, or other suitably rigid materials.

In many applications there is a need to route multiple conduits along similar paths. For example, the conduits may be electrical conduits that each carry runs of cable. Such conduits are often arranged in parallel arrays. This provides a neat appearance and also facilitates following and identifying individual conduits. Conduits designed to carry fluids (e.g. plumbing pipes, air lines, gas lines) may also be arranged in parallel arrays. It is common that an array of conduits will include conduits of two or more different diameters.

Conduits are typically installed by attaching sections of strut channel (also known as "fixture channel") at locations spaced apart along a structure (e.g. along a wall, ceiling cable tray or the like) and then clamping the conduits to the strut channel. The strut channel is usually oriented at right angles to the conduits. For example, spaced apart vertical sections of strut channel may be attached to a wall to support an array of horizontal conduits.

Strut channels are typically C-shaped in cross section. An opening extending along the strut channel is formed to receive clamps for holding conduits to the strut channel. Strut channels may, for example, comprise a metal sheet folded to provide an open channel. A conduit may be secured to multiple strut channels, spaced apart along the length of the conduit with a spacing selected to provide adequate support for the conduit. An array of parallel conduits may be clamped to the same set of strut channels.

Certain standards exist which stipulate a specified spacing between adjacent conduits. Trade practices corresponding to the particular installation scenario may also dictate a preferred spacing between adjacent conduits. Installing an array of conduits so that the conduits are parallel to one another and evenly spaced provides a professional appearance with improved aesthetics.

It can be time consuming for electricians and other tradespeople to install an array of conduits so that they are parallel and appropriately aligned (e.g. horizontal or vertical). This is especially the case where a tradesperson is working without a helper. Electricians often use a measuring tape to position clamps to achieve a desired spacing between conduits before positioning and installing a subsequent conduit. Such installation methods are time-consuming and increase the potential for error.

Some tools for aligning arrays of conduits are commercially available. However, the available tools are not versatile enough to be useful for the full range of cases in which an electrician or other tradesperson may be called upon to install an array of conduits. For example, the model 68075 conduit alignment tool manufactured by Rack-A-Tiers Mfg. Inc. is designed to allow users to align and install ¾" conduits at a spacing of 1½" by placing the conduits into evenly spaced grooves provided on the tool. This tool is not useful for conduits having sizes other than ¾ inches or in cases where it is desired to space conduits with a spacing other than 1½ inches.

There is therefore a general need for conduit installation tools which facilitate maintaining appropriate spacing between conduits in an array of conduits, particularly in cases where the conduits include conduits of two or more different sizes.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the technology described herein provides a conduit spacer tool. The conduit spacer tool may comprise a body comprising a pair of side arms, each side arm having an equal width. A slot may be defined between inner surfaces of the side arms. The slot may terminate at a groove of the body. The slot may have a width for receiving a conduit. The width of the slot may be dimensioned to correspond to a designated conduit diameter. When the conduit is fully received in the slot, the conduit may have a centre located at a longitudinal centre of the body.

In some embodiments the conduit spacer tool comprises one or more magnets located at one or more of: an end of one or both of the side arms; the body on a side of the groove opposite from the pair of side arms; and the body on a surface which defines the groove. The one or more magnets may be embedded in the body. In some embodiments the magnets are removably attachable to one or more of the conduit and a strut channel to thereby maintain a position of the conduit spacer tool relative to one or more of the conduit and the strut channel.

In some embodiments the body has a length W+2L where W is the width of the slot and L is equal to a standard strut channel depth. In some embodiments L is 0.75 inches, 1.25 inches or 1.625 inches. In some embodiments the body has a thickness in the range of ¼ to ¾ inches. In some embodiments the body is flat and has a thickness of less than ¾ inches. In some embodiments the width of each of the side arms is in the range of 0.5 to 2.5 inches. The width of each of the side arms may be approximately ⅝ inches. In some embodiments the body has a total width equaling the sum of the widths of each of the pair of side arms and the width of the slot. In some embodiments the body comprises a hole penetrating a thickness of the body. In some embodiments the body is made from one of wood, a polymeric material and a metal.

In some embodiments the conduit spacer tool comprises a bore. The bore may be configured to at least partially receive a laser.

In some embodiments the bore configured to receive the laser has a diameter that forms a friction fit with the laser.

In some embodiments a centre of the bore configured to receive the laser is aligned with the centre of the groove of the slot.

Another aspect provides a set of conduit spacer tools comprising two or more conduit spacer tools. The conduit spacer tools may comprise any feature described herein. The conduit spacer tools in the set of conduit spacer tools may have a plurality of different slot widths dimensioned to closely receive conduits of a corresponding plurality of different conduit diameters. In some embodiments the two or more conduit spacer tools are coupled together with a ring.

Another aspect provides a method for installing conduits. The method may comprise positioning a first conduit adjacent a strut channel at a desired longitudinal position along the strut channel, securing the conduit to the strut channel, positioning a conduit spacer tool around the first conduit, and positioning a subsequent conduit adjacent the strut channel and the conduit spacer tool.

In some embodiments the conduit spacer tool positioned around the first conduit is selected from a set of conduit spacer tools. The selected conduit spacer tool may have a slot dimensioned to closely match a diameter of the first conduit.

In some embodiments after positioning the conduit spacer tool around the first conduit, an open end of a slot of the conduit spacer tool faces a structure to which the strut channel is fixed. In some embodiments positioning the conduit spacer tool comprises advancing the conduit spacer tool so that the first conduit is inserted into the slot until an end of the conduit spacer tool abuts against the structure. In some embodiments after positioning the conduit spacer tool around the first conduit, an open end of a slot of the conduit spacer tool faces away from a structure to which the strut channel is fixed.

In some embodiments the structure is immediately adjacent the strut channel. Positioning the conduit spacer tool may comprise: orienting the conduit spacer tool at an upward or downward angle relative to the structure, and rotating the conduit spacer tool so that a longitudinal axis of the conduit spacer tool is perpendicular to a plane of the structure to thereby engage the conduit spacer tool in an interference fit between the first conduit and the structure. In some embodiments positioning the conduit spacer tool further comprises inserting the conduit at least partially into the slot of the first conduit prior to orienting the conduit spacer tool at an angle.

Another aspect provides a method for installing conduits. The method may comprise positioning a first conduit adjacent a strut channel at a desired longitudinal position along the strut channel, securing the conduit to the strut channel, positioning a conduit spacer tool around a subsequent conduit, and positioning the conduit spacer tool and the subsequent conduit adjacent the strut channel and the first conduit.

Another aspect provides a kit. The kit may comprise a first conduit spacer tool and a second conduit spacer tool. Each of the first and second conduit spacer tools may comprise any feature described herein. The kit may also comprise a laser. The laser may be couplable to the first and second conduit spacer tools.

In some embodiments the laser is couplable to the first and second conduit spacer tools between the first and second conduit spacer tools.

In some embodiments the laser comprises a laser pointer device.

In some embodiments the laser comprises a switch. The switch may be operable to continuously keep the laser ON.

Another aspect provides a kit. The kit may comprise a conduit spacer tool comprising any feature described herein. The kit may also comprise a plurality of clips. Each of the plurality of clips may be couplable to the conduit spacer tool and configured to secure a mobile phone or other mobile electronic device relative to the conduit spacer tool.

In some embodiments the conduit spacer tool comprises one or more cavities configured to receive nuts.

In some embodiments the kit also comprises a block comprising one or more magnets. The block may be couplable to the conduit spacer tool.

Another aspect provides a kit. The kit may comprise a conduit spacer tool comprising any feature described herein. The kit may also comprise a block comprising a cavity. The cavity may be configured to couple a tool or part to the block. The block may be couplable to the conduit spacer tool.

In some embodiments the cavity is configured to receive a threaded rod.

In some embodiments the cavity comprises a nut.

Another aspect provides a kit. The kit may comprise a conduit spacer tool comprising any feature described herein. The kit may also comprise a marker guide. The marker guide may be receivable within the slot of the conduit spacer tool. The marker guide may also comprise a bore.

In some embodiments the bore of the marker guide is centred relative to the marker guide.

Another aspect provides a kit. The kit may comprise a plurality of conduit spacers tool comprising any of the features described herein. The kit may also comprise a plurality of marker guides. Each of the marker guides may be receivable within the slot of a corresponding one of the conduit spacer tools. Each of the marker guides comprising a bore.

In some embodiments the bores of the marker guides are centred relative to the marker guides.

Another aspect provides a kit. The kit may comprise a plurality of marker guides. Each of the marker guides may comprise a bore. Each of the marker guides may be receivable within a slot of a conduit spacer tool comprising any feature described herein.

It is emphasized that the invention relates to all combinations of the above features, even if these are recited in different claims.

Further aspects and example embodiments are illustrated in the accompanying drawings and/or described in the following description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
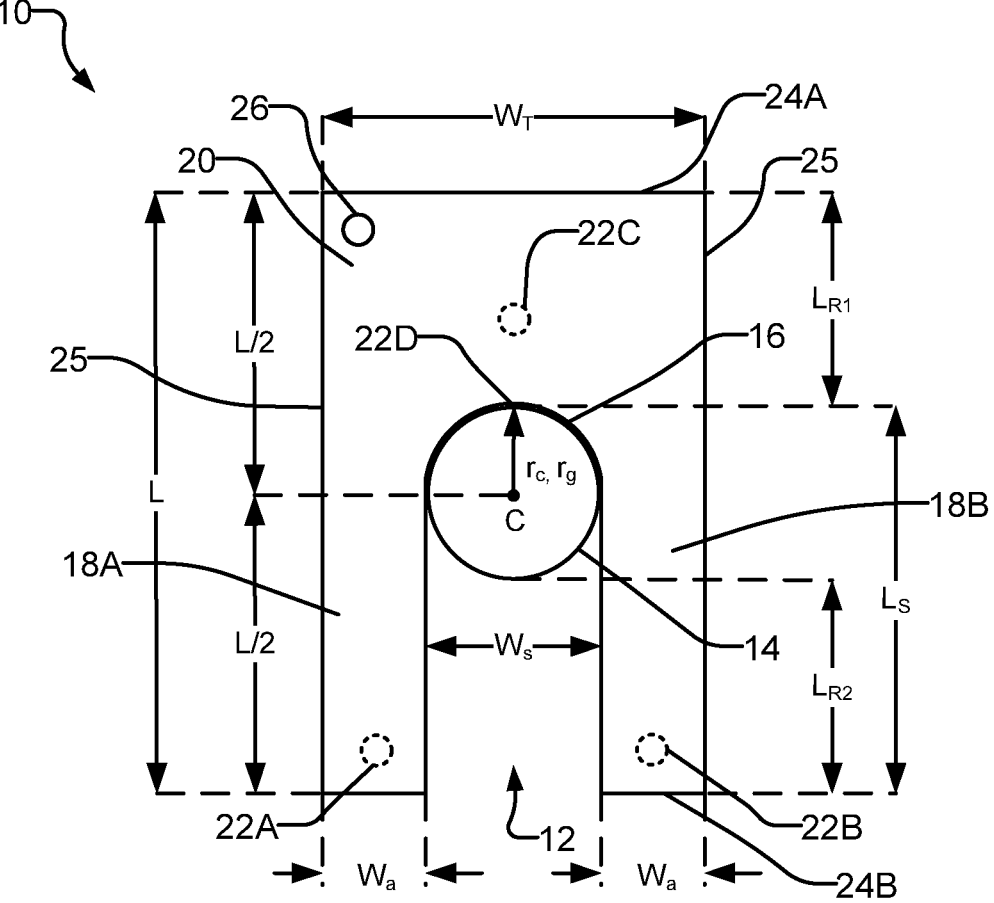
FIG. 1 is a schematic drawing of a conduit spacer tool for providing even spacing between conduits according to an example embodiment of the invention.

FIG. 1 is a schematic illustration of a conduit spacer tool 10 according to an example embodiment of the present invention. Conduit spacer tool 10 comprises a body 20 which defines an elongated slot 12 for receiving a conduit 14 having a certain diameter. As shown in FIG. 1, slot 12 terminates at a semi-circular groove 16 on body 20 of conduit spacer tool 10. Slot 12 further has a width $W_s$ which approximately matches a diameter of conduit 14. Specifically, slot 12 is preferably dimensioned to receive a conduit 14 of a designated size without requiring conduit 14 to be forced into slot 12 whilst allowing little clearance for conduit 14 to move from side to side within slot 12. In the illustrated embodiment, groove 16 is shown as being semi-circular, although this is not necessary. Any appropriate edge profile for the closed end of slot 12 is possible, the edge profile generally serving to limit how far the conduit 14 can travel into slot 12 and determine where the centre of conduit 14 is relative to tool 10 when conduit 14 is fully inserted into slot 12. In other example embodiments, the closed end of slot 12 is defined by a flat edge on body 20.

The width $W_s$ of slot 12 is determined by the spacing of the interior edges of a pair of side arms 18A and 18B (collectively referred to herein as side arms 18) of body 20. Each of side arms 18 extend by a length $L_s$ from an end of groove 16 and have a width $W_a$. Accordingly, slot 12 features a length equal to the length $L_s$ of side arms 18. Width $W_a$ corresponds to and enforces a minimum spacing between adjacent conduits 14. As illustrated, the widths $W_a$ of side arms 18A and 18B are equal. However, this is not necessary and the widths $W_a$ of side arms 18A and 18B may be different in other embodiments.

In some embodiments, side arms 18A and 18B each have a width $W_a$ in the range of 0.3" to 3", including any value therebetween, e.g. 0.5" or 2.5". According to a more specific example embodiment, width $W_a$ is around ⅝". Widths $W_a$ may be selected based on code requirements and/or trade practices for spacing between adjacent conduits according to the particular application. In some embodiments, such requirements may be based on the material of the conduits or the methods employed for fastening the conduits.

In some embodiments, groove 16 has a radius $r_g$ which matches or is slightly larger than a radius $r_C$ of conduit 14 for promoting a snug fit of conduit 14 within slot 12. A centre of curvature of groove 16 may be defined as centre C.

As shown, the centre of a fully inserted conduit 14 may also occupy the same location as centre C. In some embodiments, a conduit spacer tool 10 constrains the centre of a conduit 14 that has a diameter for which the conduit spacer tool 10 is designed to be located within a distance x of centre C in the direction of width $W_s$, where x is half of a tolerance on variation of the spacing to an adjacent conduit 14. A conduit having a diameter in the range of $W_s - 2x$ to $W_s$ can be said to "closely fit" slot 12.

In some embodiments, distance x is in the range of about 0.005 to 0.1 inches. According to a more specific embodiment, distance x is about 0.01 inches. Distance x may be selected based on factors such as convenient manufacturing tolerances for tools 10, a number of conduits 14 that are anticipated within an array of conduits to be installed, or an expected variation in the diameter of the conduits 14 within the array.

As illustrated, body 20 of conduit spacer tool 10 has an overall length L. Preferably, slot 12 has a length $L_s$ such that when a conduit 14 of the correct nominal size is fully inserted into slot 12, the centre of conduit 14 is at the longitudinal centre of body 20. This relationship can also be described as body 20 having dimensions such that body 20 has a longitudinal centre which coincides with centre C of groove 16. There is accordingly an equal distance of L/2 to each longitudinal end 24 (opposite ends respectively labelled 24A and 24B) of body 20 from the centre C of groove 16, as shown in FIG. 1. Conduit spacer tool 10 has a total width $W_T$ between transverse ends 25.

When a conduit 14 is fully inserted into slot 12, there are remaining longitudinal lengths $L_R$ of conduit spacer tool 10 from a distance $r_C$ on either side of centre C. The remaining lengths $L_R$ are represented by $L_{R1}$ and $L_{R2}$ and can be expressed as $$L_R = \frac{L}{2} - r_c.$$

Remaining lengths $L_R$ are intended to represent the lengths of conduit spacer tool 10 not occupied by a fully inserted conduit 14, as shown in FIG. 1. As discussed further herein, this equal relationship of lengths $L_{R1} = L_{R2} = L_R$ has advantageous properties in the use of conduit spacer tool 10.

Optionally, one or more magnets 22 are embedded in or are otherwise located on body 20 of conduit spacer tool 10. For example, magnets 22 may be secured in recesses or holes in body 20. Magnets 22 may magnetically couple to conduits 14, strut channels or other components of an electrical system being installed at a site to hold a tool 10 in position relative to the component(s) of the electrical system. For example, magnets 22 may magnetically coupled tool 10 to a strut channel. Additionally, magnets 22 may hold tool 10 in a desired position relative to the component(s) of the electrical system. The position of tool 10 may be varied by an operator.

In the example embodiment illustrated in FIG. 1, magnets 22A and 22B are respectively located near end 24B of body 20 on arms 18A and 18B, and a magnet 22C is located at a point on body 20 proximate to groove 16 at an opposite side of groove 16 from arms 18A and 18B. Magnets 22A and 22B may, for example, couple such example tool 10 to strut channels. Optionally, magnets 22 include a magnet 22D embedded in body 20 at (or proximate to) groove 16 such that conduit spacer tool 10 can magnetically attach to a conduit 14 formed of a magnetic material. In some embodiments magnet 22C is located close enough to groove 16 to hold body 20 to a conduit 14 located in groove 16 by magnetic forces. Additional magnets 22 which are not illustrated may be suitably located on body 20.

Body 20 of conduit spacer tool 10 may be made of any suitable material or materials. Preferably the material of body 20 is suitably rigid and durable (e.g. can withstand repeated coupling and uncoupling from conduits 14, strut channels, etc.). Non-limiting example materials for body 20 include wood, a suitable grade polymeric material, or metal. In some embodiments body 20 is made of an electrically insulating material.

Depending on the material selected for body 20, a number of possible manufacturing techniques are possible. Example techniques include additive manufacturing techniques or subtractive manufacturing techniques such as CNC milling or die cutting or punching. According to an example embodiment, body 20 is molded from a suitable plastic.

Although body 20 of conduit spacer tool 10 is illustrated as having an overall rectangular profile, this is not necessary. As an example, rounded corners may be provided on body 20. Preferably, in alternative embodiments of the invention, the relationships between the different described dimensions are preserved. Ends 24A and 24B preferably comprise at least a portion which is flat.

It is contemplated that multiple ones of conduit spacer tools 10 may be provided in a set.

Each one of the conduit spacer tools 10 in the set may, for example, have a differently sized slot 12, each of the differently sized slots 12 corresponding to a different conduit 14 diameter. For example, widths $w_s$ of the different slots 12 may correspond to different conduit diameters, such as: ½", ¾", 1", 1.5". Even where the widths $w_s$ of slots 12 differ amongst different spacers 10 in the set, the widths $w_a$ of arms 18 of different spacers 10 may all be the same. In this manner, a consistent spacing between conduits can be maintained if desired, even where the conduits are of different diameters.

In some embodiments multiple conduit spacer tools 10 may be provided in a set where each of the conduit spacer tools 10 have the same sized slot 12 (e.g. corresponding to a single conduit diameter) but different widths $w_a$ of arms 18 (e.g. to facilitate different spacing options between two adjacent conduits 14).

Optionally, conduit spacer tool 10 comprises a hole 26 that penetrates body 20. In some embodiments, multiple ones of conduit spacer tools 10 which are provided in a set are connected together by inserting a ring or a chain through hole 26 of each individual spacer 10. In this manner, multiple conduit spacer tools 10 can be carried and stored together, minimizing the chance of misplacing or losing one of conduit spacer tools 10.

Figure 2:
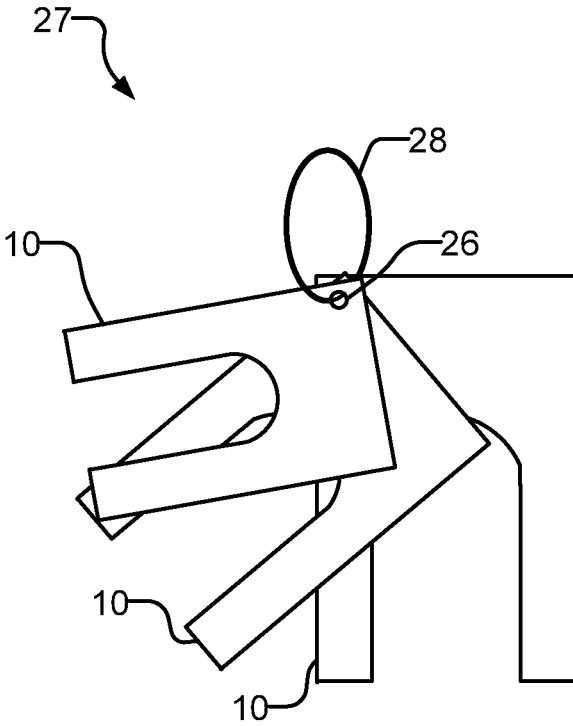
FIG. 2 is a schematic drawing of a set of conduit spacer tools.

FIG. 2 is a schematic illustration of a set 27 of three conduit spacer tools 10, each conduit spacer tool 10 having slots sized to accommodate conduits having different diameters. The three individual spacer tools 10 are attached to set 27 by a ring 28 inserted through holes 26 of all three of the conduit spacer tools 10. The use of three spacer tools 10 in set 27 is merely illustrative. In other embodiments, set 27 comprises more or fewer conduit spacer tools 10. In some embodiments, the number of conduit spacer tools 10 contained in set 27 is determined based on a particular job requirement. As an illustrative non-limiting example, where a particular job involves the installation of five types of conduits, each type of conduit having a different diameter, a set 27 comprising five appropriately sized conduit spacer tools 10 may be provided. In some embodiments, ring 28 is capable of being opened to permit different conduit spacer tools 10 to be added to or to be removed from set 27.

In some embodiments, conduit spacer tool 10 is constructed such that the distance from an end of body 20 to the bottom of groove 16 which receives the conduit is approximately equal to a standard depth of strut channel. Since strut channels may be supplied in a few different standard depths, conduit spacer tools 10 or sets 27 of conduit spacer tools 10 may be provided for use with different depths of strut channels.

Some example standard strut channel depths are 0.75", 1.25" and 1.625". A conduit spacer tool 10 having remaining lengths $L_R$ approximately matching the channel depth specific to the particular strut channel being used can advantageously be selected for use, as discussed later herein. In some embodiments, different sets of conduit spacer tools having different dimensions for length $L_R$ are provided for accommodating the installation of conduits on differently sized strut channels.

In general, conduit spacer tools 10 and/or sets 27 of conduit spacer tools 10 may be provided for any combination of:

different conduit diameters (e.g. by varying slot width $w_s$);

different spacing between adjacent conduits (e.g. by varying arm width $w_a$); and different strut channel depths (e.g. by varying total body length L relative to slot width $w_s$).

Sets of conduit spacer tools 10 that have different combinations of these features may be provided.

Figure 3:
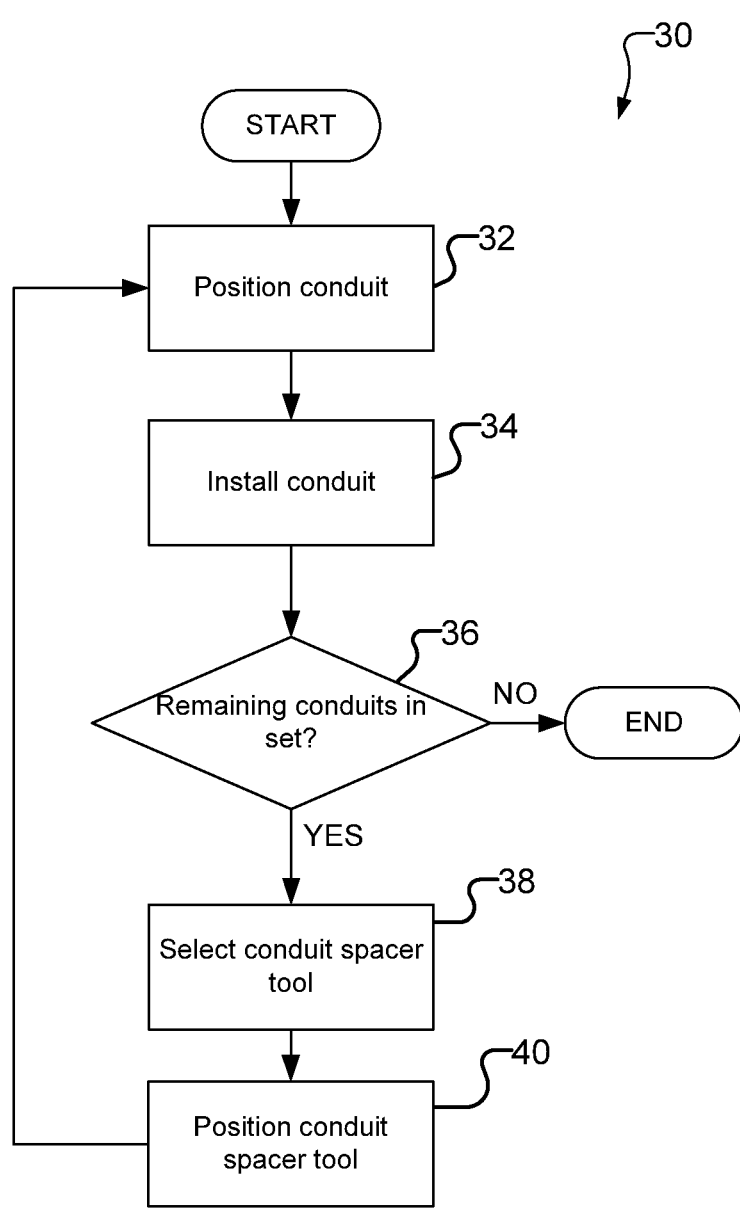
FIG. 3 is a block diagram showing an example method for using conduit spacer tools to install conduits according to an example embodiment.

FIG. 3 is a block diagram of an example method 30 for using conduit spacer tools described herein for installing a set of adjacent conduits where a certain spacing between conduits is desired. Method 30 contemplates the use of a set of conduit spacer tools which are sized to accommodate conduits having different diameters, as described above.

Figure 4B:
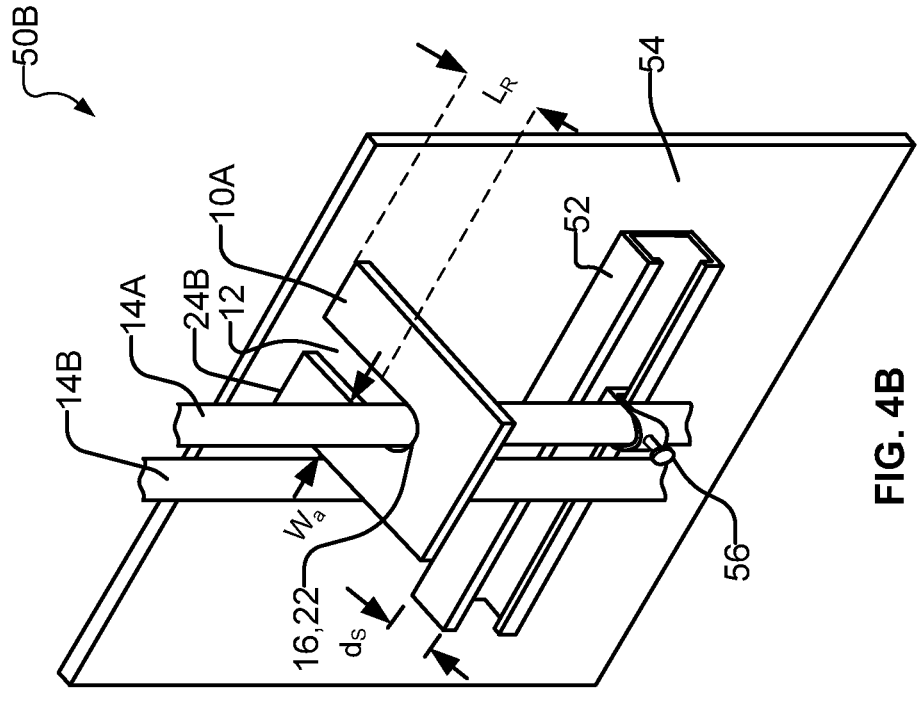
FIGS. 4A and 4B are perspective views of two possible configurations for using conduit spacer tools according to an example embodiment where conduits are installed in a vertical configuration.
Figure 4A:
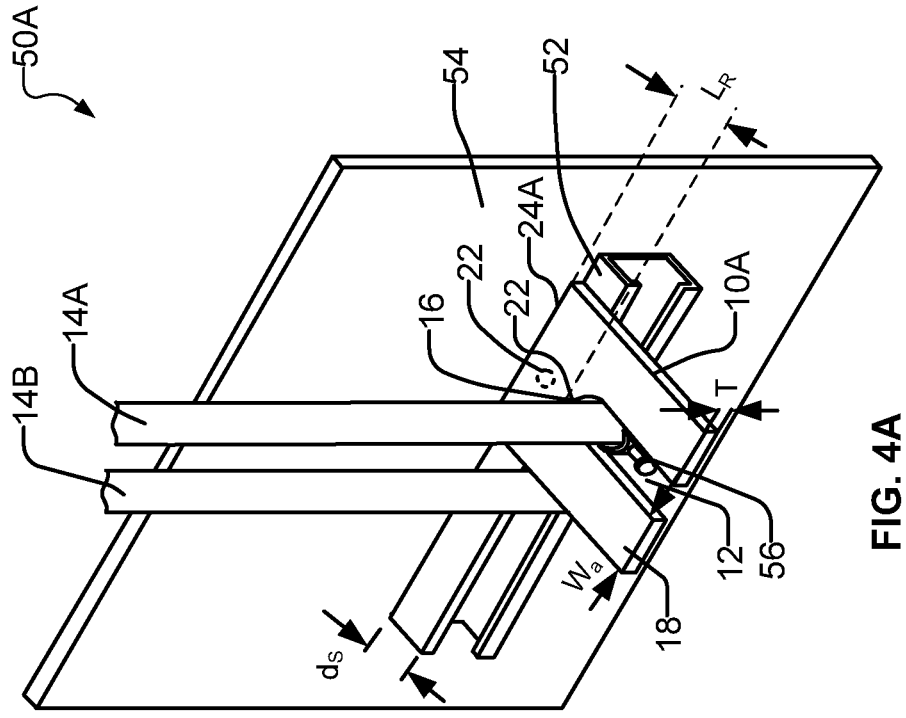

FIG. 4A is a perspective view showing an example configuration 50A for using conduit spacer tool 10A when installing conduits 14. The example method 30 of FIG. 3 is illustrated with reference to FIG. 4A, as discussed below.

Configuration 50A shows an adjacent pair of conduits 14A and 14B being secured to a strut channel 52. Strut channel 52 is in turn secured to wall 54 through any appropriate means known in the art, such as through fastening by anchor bolts or screws or through bonding methods. In other embodiments, strut channel 52 is mounted to a fixed structure by way of an intermediate connector, such as through threaded rods attached to a ceiling of a building.

Method 30 begins at block 32 which comprises positioning a conduit on a strut channel. Positioning the conduit on the strut channel comprises a user placing the conduit to be installed at a desired longitudinal position of the strut channel at a desired longitudinal position of the conduit. There are a number of ways for determining the proper longitudinal position on the strut channel for installing the conduit spacer tool. For example, if the conduit being positioned is the first conduit amongst a set of conduits, a position along the strut channel a certain distance away from an end of the strut channel or another fixed structure may be selected as the position of the conduit. If the conduit is not the first one of a set, there may be a previously positioned conduit spacer tool which enforces a certain minimum spacing from the previous conduit to thus determine where the conduit should be positioned at block 32.

After the conduit has been appropriately positioned, method 30 proceeds to block 34. Block 34 comprises securing the conduit positioned at block 32 onto the strut channel. Any appropriate means known in the art may be used for securing the conduit to the strut channel, such as through the use of conduit clips or clamps.

Method 30 then proceeds to decision block 36 which comprises evaluating whether there are conduits which remain in the set of conduits to be installed. If the evaluation at block 36 is negative, then method 30 ends. If the evaluation at block 36 is positive and there are remaining conduits to be installed, method 30 proceeds to block 38. Block 38 comprises selecting an appropriately sized conduit spacer tool (e.g. conduit spacer tool 10) for the conduit that was installed at block 34. The conduit spacer tool that is selected should have a slot having a width which approximately matches the diameter of the conduit, and which accordingly allows the conduit to be inserted into the slot of the conduit spacer tool with a snug fit.

With reference to FIG. 4A, the first conduit 14A may first be positioned at the illustrated position at block 32. Subsequently, at block 34, conduit 14A may be secured to strut channel 52 with a conduit clamp 56. Decision block 36 determines that there are subsequent conduits in the set of conduits to be installed (i.e. conduit 14B) and so method 30 proceeds to block 38. At block 38, a conduit spacer tool 10A is selected from a set of differently sized conduit spacer tools, the selected conduit spacer tool 10A having a slot 12 with a width corresponding to the diameter of conduit 14A.

Method 30 then proceeds to block 40. Block 40 comprises positioning the selected conduit spacer tool around the conduit installed at block 34. In preferred embodiments, block 40 comprises inserting the conduit fully into the slot of the conduit spacer tool. In other words, the conduit is in contact with a wall at the end of the slot (e.g. conduit 14 being in contact with a wall of groove 16 in the FIG. 1 embodiment).

In some embodiments, the conduit spacer tool is positioned such that an open end of the slot (e.g. slot 12) is facing a structure to which the strut channel is fixed. Typically, this comprises positioning the conduit spacer tool so the open end of the slot is facing away from the user. In such embodiments, a user may hold the conduit spacer tool so that a longitudinal axis of the body of the conduit spacer tool is substantially perpendicular to the fixed structure. The user may then advance the conduit spacer tool around the conduit along the length of the slot in performing block 40.

In other embodiments, the conduit spacer tool is positioned such that an open end of the slot is facing away from the fixed structure, or towards the user. In such embodiments, a user may hold the conduit spacer tool between the conduit and the fixed structure and then likewise position the conduit spacer tool around the conduit. In some embodiments, the fixed structure is immediately adjacent the strut channel. As described above, some embodiments provide a conduit spacer tool having a remaining length following the insertion of a conduit which approximately equals a standard depth of a strut channel. In such embodiments, it is not possible for the conduit spacer tool to be advanced toward the conduit perpendicularly from the fixed structure.

Referring to FIG. 4A, conduit spacer tool 10A is positioned in this manner where the open end of the slot faces away from the fixed structure. A remaining length $L_R$ of body 20 of conduit spacer tool 10A between an end of semi-circular groove 16 and end 24A matches approximately with a depth $d_s$ of strut channel 52. Thus, an installed conduit 14A, when fully inserted in slot 12 of conduit spacer tool 10A, may be substantially adjacent both an outer edge of strut channel 52 (i.e. away from wall 54) and a wall of groove 16. Concurrently, an end 24A of conduit spacer tool 10A is immediately adjacent the wall 54.

It will be apparent that by providing a length $L_R$ which corresponds very closely with depth $d_s$ in the FIG. 4A configuration, there is little opportunity for conduit spacer tool 10A to be wiggled around or rotated. Specifically, the abutment of edge 24A against wall 54 prevents the rotational motion of spacer 10A and the presence of conduit 14A fully inserted in slot 12 further prevents the lateral motion of conduit spacer tool 10A. In this manner, there is little ambiguity as to whether conduit spacer tool 10A is properly positioned.

When performing block 40 for the example configuration 50A, the positioning of conduit spacer tool 10A may comprise positioning conduit spacer tool 10A at an upward or downward angle (i.e. non-perpendicular angle) relative to wall 54 and then rotating conduit spacer tool 10A so that conduit 14A is fully inserted into slot 12 (i.e. conduit 14A is in contact with a wall of groove 16) and an end 24A of conduit spacer tool 10A is resultantly immediately adjacent wall 54. The conduit spacer tool 10A may assume the illustrated perpendicular orientation relative to wall 54 by such rotation. When performing block 40, a user may optionally initially hold conduit spacer tool 10A at an angle such that a portion of arms 18 defining slot 12 surrounds conduit 14A to properly align spacer 10A with conduit 14A.

The decision of whether to position the conduit spacer tool such that the open end of the slot faces the fixed structure (i.e. away from the user) or whether the open end of the slot faces away from the fixed structure (i.e. towards the user) can depend on the user's preferences. As an illustrative example, for a new installation, it may be preferable to first position the conduit spacer tool with the open end of the slot facing the user so that conduit can simply be inserted into the slot. In a retrofit scenario or where a conduit is being added to an existing array of conduits, it may be preferable to insert the conduit spacer tool around an installed conduit such that the slot faces away from the user. In some embodiments, space constraints may require that conduit spacer tools are installed in one configuration as opposed to the other. In an example embodiment wherein an array of conduits is being installed against a Q deck comprising spaced apart rib channels, the obstruction from the channeling may require that the conduit spacer tool be positioned so that the open end of the slot faces away from the user.

In some embodiments, positioning the conduit spacer tool at block 40 comprises temporarily fixing the position of a conduit spacer tool. As an example, one or more magnets embedded in the conduit spacer tool (e.g. magnets 22) allow for a user to temporary fix the conduit spacer tool onto the strut channel. Optional magnets embedded in the slot of the conduit spacer tool may also permit the conduit spacer tool to be magnetically fixed onto the conduit at a desired longitudinal position of the conduit (potentially at a location away from the strut channel). Other means of facilitating temporary attachment are appropriate, such as through the use of a weak adhesive. In other embodiments, the conduit spacer tool may be held in place at the desired location by the user.

In a preferred embodiment, positioning the conduit spacer tool at block 40 comprises ensuring a proper alignment of the conduit spacer tool. In some embodiments, ensuring a proper alignment comprises positioning the conduit spacer tool such that a longitudinal end of the conduit spacer tool aligns with and is approximately coincident with an end of the strut channel most proximate the structure to which the channel is fixed. This is shown for example in FIG. 5 where conduit spacer tool 10C is positioned with end 24A coincident with end 52-2 of strut channel 52. Ensuring proper alignment may comprise a user visually verifying that such alignment has occurred. The user may rotate the conduit spacer about an installed conduit until proper alignment is achieved.

Additionally, or in the alternative, ensuring a proper alignment may comprise positioning a longitudinal end of the conduit spacer tool against a surface of the structure to which the channel is fixed. Such engagement against the surface of the structure advantageously holds the tool against rotation. In such embodiments, a longitudinal axis of the conduit spacer tool is preferably substantially perpendicular to the plane of the fixed structure (e.g. conduit spacer tools 10A and 10B being perpendicular to wall 54 in FIGS. 4A and 4B).

By ensuring proper alignment as described above, the arm widths of conduit spacer tools 10 as described herein can provide a spacing which accurately and consistently represents a desired minimum spacing between conduits along the length of the strut channel. This is shown in FIGS. 4A and 4B where width $w_a$ of arms 18 enforces a minimum spacing between conduits 14A and 14B.

Following the completion of block 40, method 30 returns to block 32 where another conduit is selected and positioned. Due to the arms which define the slot of the conduit spacer tool installed at block 40 (e.g. arms 18 of conduit spacer tool 10), a minimum spacing represented by the width of one of the arms is enforced between the previously installed conduit and the subsequent conduit to be installed. In preferred embodiments, the desired position for the subsequent conduit at block 32 is the location at which the conduit is in contact with a point along the longitudinal edge (e.g. a point on transverse end 25) of the previously positioned conduit spacer tool. This is illustrated in FIG. 4A where a minimum spacing between conduit 14A and a subsequently positioned conduit 14B is enforced by the width $w_a$ of arms 18 of conduit spacer tool 10A.

Because the user is not required to hold the conduit spacer tool positioned at block 40 (such as where magnets 22 are used), the user can advantageously perform blocks 32 and 34 (in subsequent iterations) more easily with the use of both hands. In some embodiments, after a subsequent conduit is installed at block 34, the previously positioned conduit spacer tool at block 40 may be removed, as the desired spacing between those adjacent conduits will have been already set.

Method 30 is an example method for using conduit spacer tools 10 to obtain a desired spacing between conduits within a set of conduits. However, it will be appreciated that conduit spacer tools herein can be used in a manner different from that which is described in method 30 to obtain desired spacing between conduits. For example, according to another example embodiment, a conduit spacer tool is selected and positioned as the initial step. The conduit spacer tool may be positioned with the centre of the slot of the conduit spacer tool located at the desired conduit installation position along the strut channel. The conduit spacer tool may be oriented in any of the possible orientations described above. Subsequently, a user may insert a correspondingly sized conduit into the slot of the positioned conduit spacer tool. The conduit may then be attached to the strut channel.

According to an alternative embodiment, blocks 38 and 40 of method 30 are performed with respect to the subsequent conduit to be positioned/installed, rather than the conduit that was previously installed. Accordingly, selecting a conduit spacer tool at block 38 comprises selecting a conduit spacer tool having a slot width which approximately matches the diameter of the subsequent conduit. At block 40, the subsequent conduit is inserted into the slot of the conduit spacer tool, with the conduit being desirably positioned at block 32 adjacent the previous conduit (with the conduit spacer tool being in either of the described orientations). In this alternative embodiment, the conduit spacer tool also serves to enforce a minimum spacing between adjacent conduits.

The equal relationship between remaining length $L_R$ of conduit spacer tool 10A and depth $d_s$ of strut channel 52 in the FIG. 4A example has beneficial properties, as discussed above. However, this relationship can interfere with unimpeded positioning of conduit spacer tool 10A against a strut channel where conduit 14A is already installed on the strut channel and the open end of slot 12 is oriented to face the user. The method of rotating conduit spacer tool 10A into position is discussed above. During this rotation of conduit spacer tool 10A, there will be a point when a top or bottom edge of end 24A first contacts wall 54. Due to the tight fit of conduit spacer tool 10A between conduit 14A and wall 54, a user may have to apply moderate force to overcome the interference at this point of contact in order to achieve the illustrated position wherein a planar face of end 24A is flush against wall 54 and conduit spacer tool 10A is substantially perpendicular to wall 54.

A similar principle is applicable in cases where a user wishes to remove a conduit spacer tool 10A that was previously positioned (such as in configuration 50A). In such cases, the user may also have to apply some force to rotate conduit spacer tool 10A to free it from the interference created between conduit 14A and wall 54.

As illustrated, conduit spacer tool 10A has a thickness T. Accordingly, end 24A has an area defined as the product of the total width $W_T$ (see FIG. 1) and thickness T. The amount of force required for a user to rotate conduit spacer tool 10A against the interference of wall 54 according to configuration 50A (i.e. where a conduit spacer tool frictionally engages the wall and conduit) or to remove conduit spacer tool 10A from such a configuration depends on at least the area of end 24A. Generally, smaller areas of end 24A will require the application of a smaller force while larger areas of end 24A will require the application of a greater force.

Additionally, the forced rotation of conduit spacer tool 10A against wall 54 causes conduit spacer tool 10A to experience a bending moment. While a smaller thickness T of conduit spacer tool 10A would require a lesser application of force, conduit spacer tool 10A would be more susceptible to snapping. Accordingly, spacer 10A is preferably constructed from a suitably resilient material which has a thickness T which does not require a user to have to apply an excessive amount of force when using conduit spacer tool 10A, but not so small that the tool is susceptible to snapping.

In some embodiments, conduit spacer tool 10A has a thickness Tin the range of about ⅛" to 1", including any value therebetween, e.g. ¼" to ¾". According to a more specific example embodiment, conduit spacer tool 10A has a thickness of about ¼".

Preferably, the thickness T of conduit spacer tool 10A does not exceed about 1 inch. At too great a thickness T, a user may be unable to forcibly rotate conduit spacer tool 10A into the desired position without causing damage to the conduit spacer tool or the wall. Additionally, in embodiments where conduit spacer tool 10A is positioned prior to installing conduit 14A, a spacer 10A which is too thick may not be releasable by the user without having to remove the installed conduit. In some embodiments, the thickness T of conduit spacer tool 10A is non-uniform. The above considerations are most relevant to the thickness around the area of end 24A, and so other thickness profiles are possible for conduit spacer tool 10A.

FIG. 4A illustrates a number of example methods for maintaining a position of conduit spacer tool 10A. Such methods advantageously allow a user to attend to other tasks, such as positioning and installing subsequent conduit 14B without having to manually hold conduit spacer tool 10A in position. As discussed, magnets 22 embedded in conduit spacer tool 10A allow a user to temporarily fix conduit spacer tool 10A to strut channel 52 and/or to conduit 14A (where a magnet 22 is embedded at groove 16). In some embodiments, an interference fit is created by the tight fit of conduit spacer tool 10 between conduit 14A and wall 54 to thereby maintain a position of conduit spacer tool 10A.

Although conduit 10A is illustrated as being positioned on strut channel 52, this is not necessary. Several ones of these above mechanisms for temporarily fixing conduit 10A allow for conduit 10A to be suitably positioned along the length of conduit 14A at a location away from strut channel 52.

Figure 4D:
FIGS. 4C-4D are photographs showing the removal of a conduit spacer tool which was previously positioned.
Figure 4C:
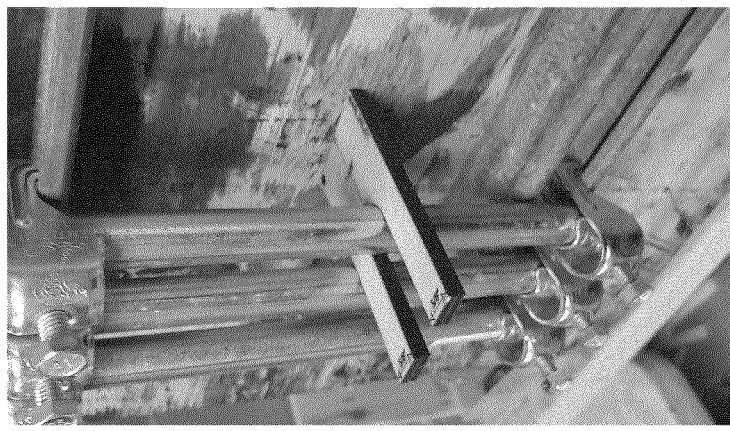

FIGS. 4C and 4D show an example of a conduit spacer tool (e.g. conduit spacer tool 10A) which has a thickness allowing it to be positioned according to the above-described interference fit between a conduit and a wall. FIG. 4D shows that a user can release the conduit spacer tool from the interference fit with relative ease.

FIG. 4B shows another possible configuration 50B for positioning conduit spacer tool 10A wherein the opening of slot 12 faces towards wall 54. Many of the concepts relating to the use of conduit spacer tool 10A described in relation to configuration 50A are applicable in the case of configuration 50B. For example, the order of steps in which conduit spacer tool 10A may be used in configuration 50B may be similar to the method 30 steps described in relation to configuration 50A. However, a notable difference is that conduit 10A in configuration 50B can simply be positioned around conduit 14A (e.g. at block 40), for example, by advancing conduit spacer tool 10A so that conduit 14A is inserted into slot 12. Even where wall 54 is immediately adjacent strut channel 52 (as shown), there is no corresponding desire to install spacer 10A from an angled position, as in the case of configuration 50A.

When conduit spacer tool 10A is positioned according to configuration 50B, a planar end 24B of conduit spacer tool 10A abuts wall 54 to enforce the proper angular alignment of spacer 10A. Furthermore, the inserted conduit 14A further prevents the lateral motion of conduit spacer tool 10A. As such, the width $w_a$ of arms 18 may effectively enforce a minimum spacing between adjacent conduits 14A and 14B.

As illustrated in FIG. 4B, a remaining length $L_R$ of conduit spacer tool 10A approximately corresponds to half the length of body 20 minus half the radius of the installed conduit 14A. This length $L_R$ also matches the depth $d_s$ of strut channel 52, similar to that shown in configuration 50A. However, such a relationship is optional in this orientation, as a length $L_R$ longer than depth $d_s$ does not preclude abutment of end 24B against wall 54 to prevent rotation of conduit spacer tool 10A. However, such a relationship may be advantageously maintained in scenarios where the strut channel is not fixed directly to a wall so that a user can visually verify the proper positioning of a conduit spacer tool by ensuring that ends of the conduit spacer tool and strut channel align.

As illustrated, conduit spacer tool 10A is positioned at a location away from strut channel 52. In such an embodiment, magnets 22 embedded in body 20 at the location of groove 16 may allow for conduit spacer tool 10 to be temporarily attached to a magnetic conduit 14A. Other methods for temporarily fixing the position of conduit spacer tool 10A described herein are appropriate.

As illustrated by FIGS. 4A and 4B, the use of conduit spacer tool 10A with the opening of slot 12 either facing away from (configuration 50A) or towards (configuration 50B) a fixed structure are both appropriate for enforcing a minimum spacing between conduits. Although configurations 50A and 50B of FIGS. 4A and 4B illustrate conduits which are mounted in a vertical orientation to a strut channel attached to a vertical wall, it will be appreciated that other configurations are possible. For example, a set of conduits may be installed horizontally on a ceiling mounted strut channel, the conduits appropriately spaced using one or more of the conduit spacer tools described herein.

Figure 5:
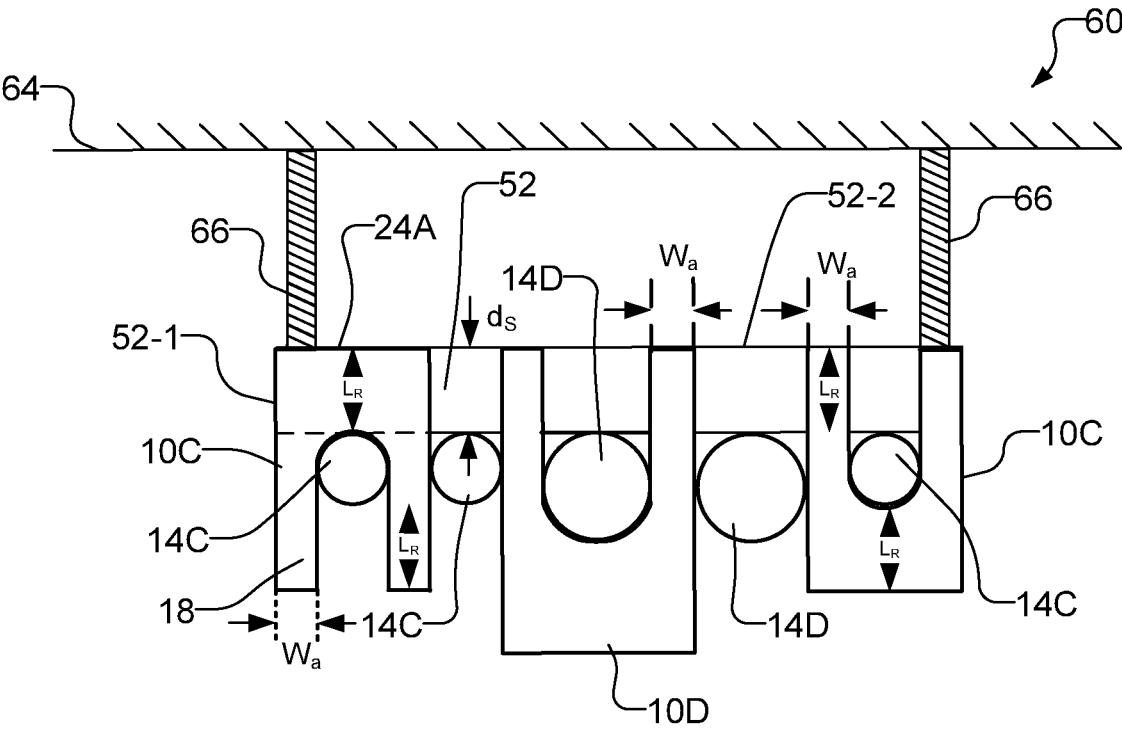
FIG. 5 is a schematic elevation view of a set of conduits installed in a horizontal configuration, the conduits being spaced by conduit spacer tools.

FIG. 5 is an elevation view showing a schematic arrangement 60 of a set of conduits 14 and conduit spacer tools 10. The set of conduits 14 are installed in a horizontal configuration in arrangement 60. Arrangement 60 shows that a strut channel 52 is mounted to a ceiling 64 of a building by way of two threaded rods 66. As shown, there are a number of differently sized conduits 14 and conduit spacer tools 10. Specifically, conduits 14C have a smaller diameter than conduits 14D. Conduit spacer tools 10C are dimensioned to accommodate conduits 14C while conduit spacer tool 10D is dimensioned to accommodate the larger diameter conduit 14D.

In some embodiments, a spacing of conduits from an edge of the strut channel to which the conduits are installed can be set using the conduit spacer tools described herein. In the illustrated embodiment, assuming the conduits were installed from left to right, the first conduit 14C is spaced from a longitudinal end 52-1 of strut channel 52 by width $w_a$ of arms 18 of conduit spacer tool 10C. The determination of a desired position for the start of a set of conduits using other means is possible. For example, a first conduit 14 may be positioned based on a certain distance (e.g. width $w_a$) from an inward facing edge of rod 66.

As shown, both conduit spacer tools 10C and 10D comprise arms 18 having uniform widths $w_a$. Accordingly, a uniform spacing between conduits of different sizes can be easily achieved where desired using the methods described herein. Conduit spacer tool 10C is illustrated as being positioned in two possible configurations; one in which slot 12 is facing ceiling 64 (i.e. facing upwards) and another in which slot 12 is facing away from ceiling 64 (i.e. facing downwards). Optionally, both orientations feature equal remaining lengths $L_R$ which match the depth $d_s$ of strut channel 52. As discussed, this advantageously enables a user to position conduit spacer tools 10C with respect to strut channel 52 by ensuring that an end 24 of the conduit spacer tool 10 and end 52-2 of strut channel 52 visually align.

Using the temporary fixing methods described herein (e.g. through the use of magnets and/or slight interference fits), it is possible for conduit spacer tools 10 to be temporarily fixed at desired locations. As shown, the right-most conduit spacer tool 10C and conduit spacer tool 10D remain fixed in spite of the gravitational forces acting thereon. In some embodiments, one or more conduit spacer tools 10 are able to temporarily support a horizontally positioned conduit 14 against gravity to allow the user to attend to other tasks.

In such embodiments, the number, size and strength of magnets 22 in conduit spacer tool 10 may be set based on the weight and diameter of the corresponding conduit. In some embodiments, a set of conduits 14 may be installed in a horizontal fashion similar to arrangement 60, but instead the set is installed on top of strut channel 52, rather than below it.

In some embodiments one or more tools 10 are configured to hold or support a laser. The laser comprises a laser device operable to generate a laser beam. The generated laser beam may be used to guide installation of new sections of conduit (e.g. conduit 14), channel struts and/or other components of a new electrical installation. For example, new sections of conduit to be installed may be aligned relative to the laser beam. In some cases an alignment board (e.g. a board comprising one or more markings configured to properly position a conduit relative to the laser beam) is used to align new sections of conduit relative to the laser beam. As another example, the laser beam may indicate where a channel strut should be installed at an opposing end of an installation site. As another example, the laser beam may indicate where an anchor point (or anchor points) should be installed. As another example, the laser beam may indicate a location at which a conduit will pass through a surface (e.g. a building wall, floor, ceiling, a wall of a box, etc.).

The laser may advantageously be significantly simpler than current commercially available laser leveling devices available from manufactures such as DEWALT™, BOSCH™, etc. In some embodiments the laser comprises a laser pointer type device that has an elongated body containing a laser light source operable to emit a light beam that is aligned with a longitudinal axis of the body. In some embodiments the laser comprises a switch (e.g. a latching switch) operable to turn the laser ON to continuously emit a light beam or OFF. The switch is preferably easily accessible once the laser is coupled to one or more tools 10.

Preferably a pair of tools 10 are each configured to hold the laser relative to one or more components of an electrical installation with the body of the laser extending between the pair of tools. A direction of the laser beam generated by the laser may be adjusted by varying a position and/or orientation of one or both of the tools 10 which hold the laser. A position and/or orientation of one or both of the tools 10 which hold the laser may be individually adjusted. A user may use such adjustments to aim the laser to provide a line between the location of the laser and a reference point (e.g. a spot that has a defined relationship to a location to which a conduit that is engaged by the tools 10 which support the laser will be extended).

Figure 6A:
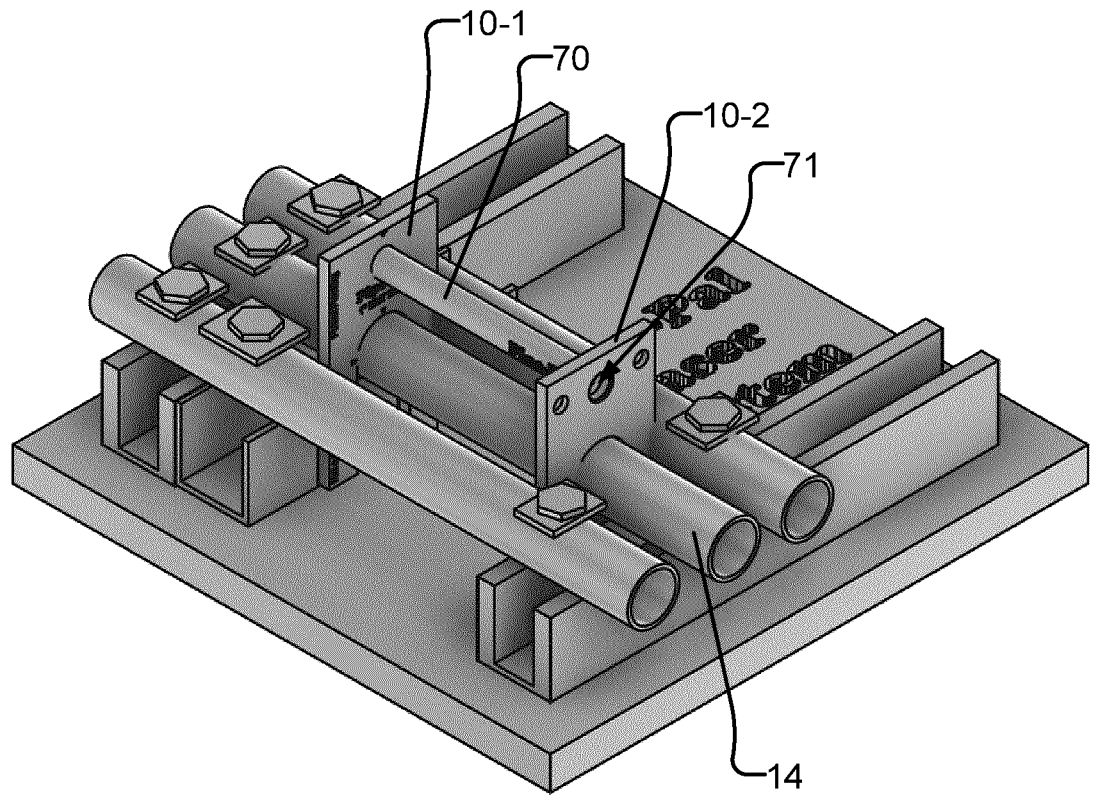
FIG. 6A is a schematic perspective view of a laser coupled to an electrical installation according to an example embodiment of the invention.

FIG. 6A is a perspective view illustrating an example laser 70 held between a pair of tools 10 (e.g. tools 10-1 and 10-2). Tools 10-1 and 10-2 may be coupled to conduit 14 and/or other components of the electrical installation (e.g. strut channels, etc.) using any method described herein. Tools 10-1 and/or 10-2 may be moved to adjust the aim of a beam produced by the laser. Once the desired aim has been achieved, magnets of tools 10-1 and 10-2 may hold tools 10-1 and 10-2 in place such that the desired aim is preserved.

Figure 6B:
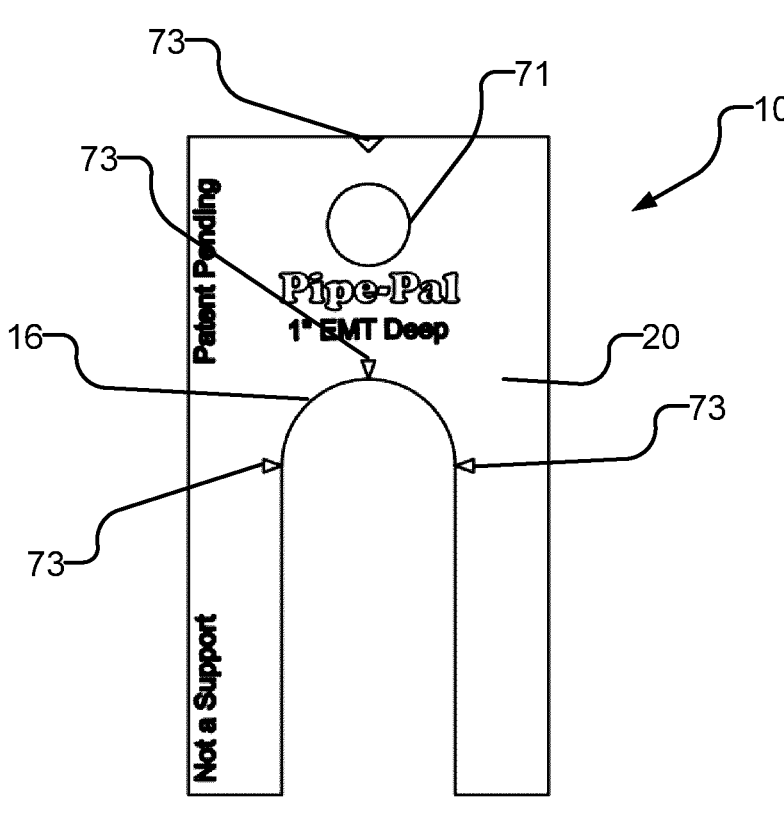
FIG. 6B is a front view of a conduit spacer tool configured to support the laser of FIG. 6A according to an example embodiment of the invention.
Figure 6C:
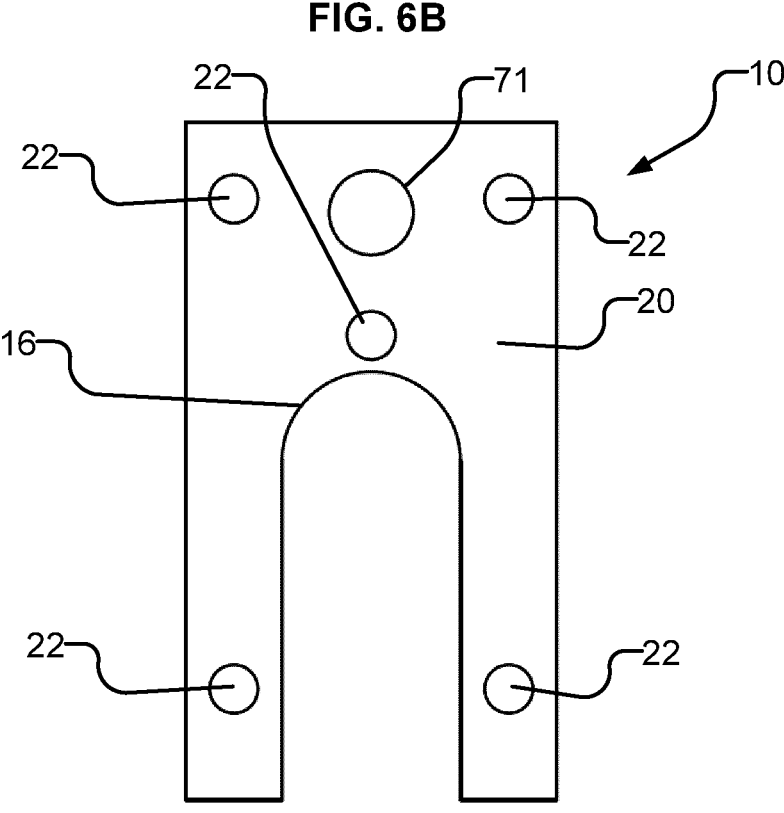
FIG. 6C is a rear view of the conduit spacer tool of FIG. 6B.
Figure 6D:
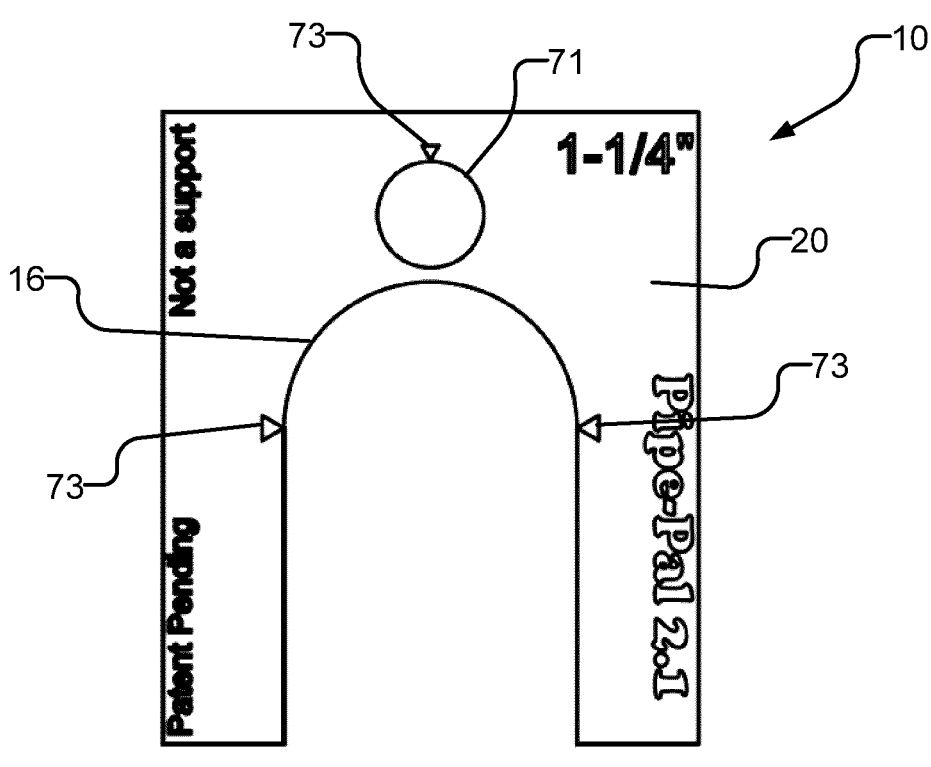
FIG. 6D is a front view of a conduit spacer tool configured to support the laser of FIG. 6A according to an example embodiment of the invention.
Figure 6E:
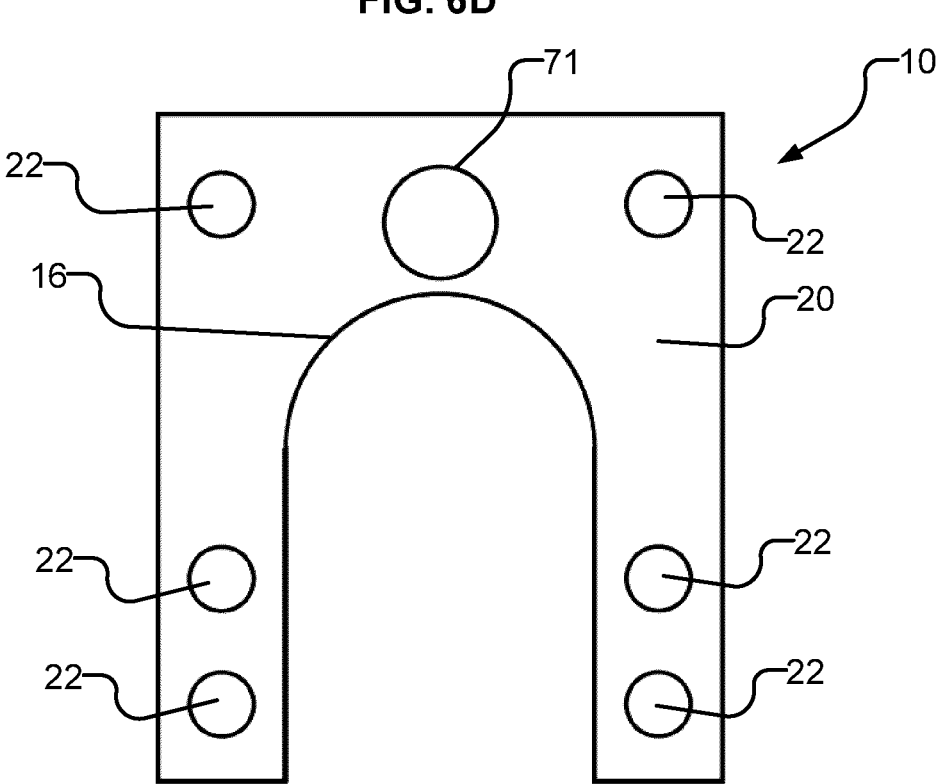
FIG. 6E is a rear view of the conduit spacer tool of FIG. 6D.

FIGS. 6B and 6C illustrate front and rear views of an example tool 10 for holding or supporting laser 70. FIGS. 6D and 6E illustrate front and rear views of another example tool 10 for holding or supporting laser 70. As shown in FIGS. 6B to 6E, bodies 20 of such example tools 10 comprise a bore 71. An end of the body of laser 70 may be at least partially inserted through bore 71. In some embodiments the body of laser 70 is dimensioned to form a friction fit with bore 71. The friction fit may hold a position of laser 70 relative to tool 10. In embodiments where a pair of tools 10 hold or support laser 70 a first end of the body of laser 70 may be inserted through a bore 71 of a first tool 10 (e.g. tool 10-1) and a second opposing end of the body of laser 70 may be inserted through a bore 71 of a second tool 10 (e.g. tool 10-2).

A centre of bore 71 is typically aligned with a center C of semi-circular groove 16. Aligning the centers of bore 71 and groove 16 advantageously may at least grossly align the laser beam generated by laser 70 to be parallel with, for example, a central longitudinal axis of an already installed section of conduit. A spacing of the laser beam from the central longitudinal axis of the conduit is set by the distance between the centre of groove 16 and the centre of bore 71.

In some embodiments bore 71 comprises one or more features which interact with one or more corresponding features of laser 70 to assist in aligning laser 70 relative to bore 71. For example, bore 71 may comprise a protrusion which interacts with a corresponding groove in the body of laser 70 to align laser 70 relative to bore 71.

As described elsewhere herein, tool 10 may comprise a plurality of magnets 22 to hold tool 10 in position relative to components of an electrical installation (e.g. channel struts, installed sections of conduit, etc.). Preferably, magnets 22 are strong enough to also hold tool(s) 10 and a laser (e.g. laser 70) in position once a laser is coupled to one or more tools 10. Depending on a size (e.g. length) of tool 10 and/or a size (e.g. diameter) of bore 71 the number of magnets 22 may vary. Additionally, or alternatively, depending on a size (e.g. length) of tool 10 and/or size (e.g. diameter of bore 71) body 20 may or may not include a magnet 22 proximate to groove 16. For example, tool 10 shown in FIGS. 6D and 6E does not comprise a magnet 22 proximate to groove 16. In some embodiments the number of magnets 22 may vary based on individual strengths of each magnet 22.

In some embodiments body 20 of tool 10 comprises markings 73. Markings 73 may assist a user with generating one or more offset bends or the like in a section of conduit being installed. For example, markings 73 may be positioned at positions that are spaced apart 90° from one another. As shown in FIGS. 6B and 6D the markings may, for example, comprise triangles that are partially recessed within body 20 of tool 10. Although tools 10 illustrated in FIGS. 6B and 6D comprise a bore 71, markings 73 may be included as part of tools 10 which do not comprise a bore 71.

Figure 7A:
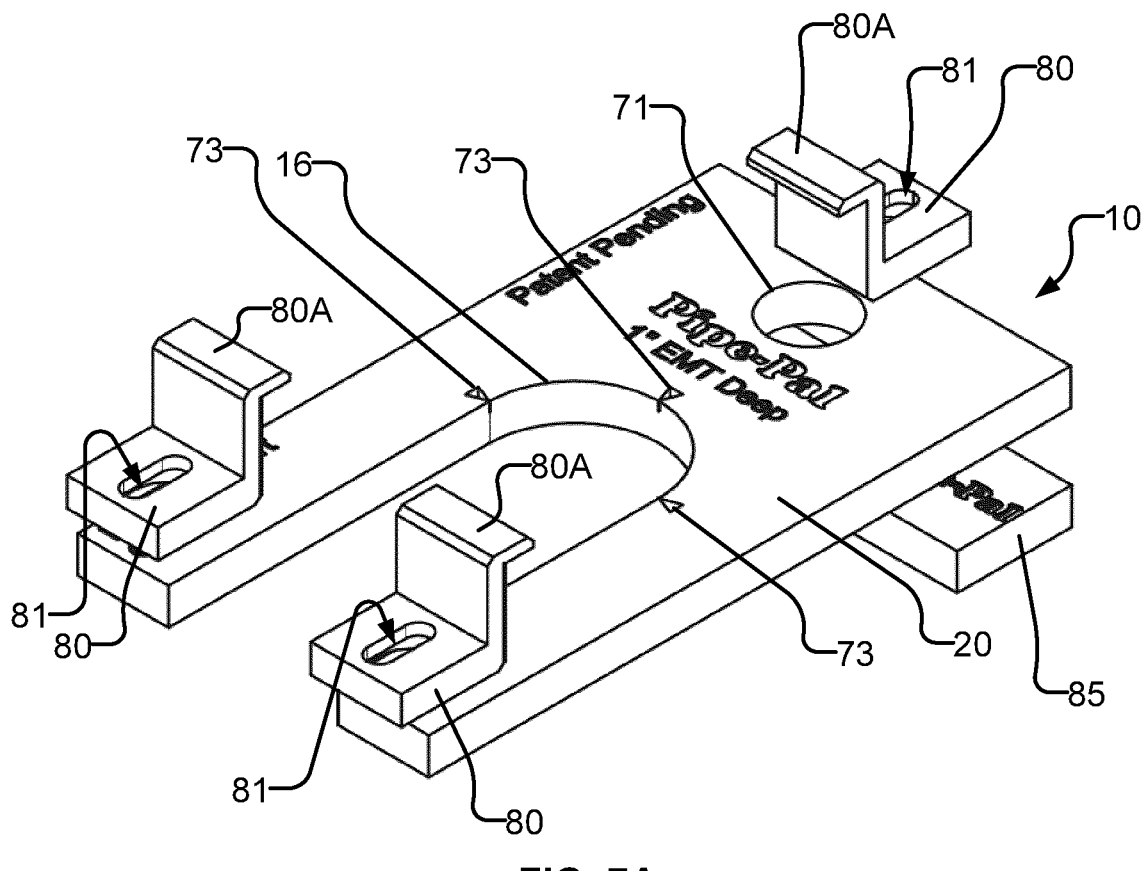
FIG. 7A is a schematic perspective view of a conduit space tool configured to support a mobile phone or other mobile electronic device according to an example embodiment of the invention.

In some embodiments tool 10 is adapted to hold a mobile phone or other mobile electronic device (e.g. a tablet, etc.). As shown in FIG. 7A, a plurality of clips 80 may be coupled to tool 10. Clips 80 are configured to hold the phone or other mobile electronic device in a desired position relative to tool 10. Clips 80 may comprise a lip 80A which extends over a portion of the phone or mobile electronic device to secure the phone or mobile electronic device relative to tool 10. Although FIG. 7A illustrates three clips 80, any number of clips 80 may be used to secure the phone or other mobile electronic device relative to tool 10.

Figure 7B:
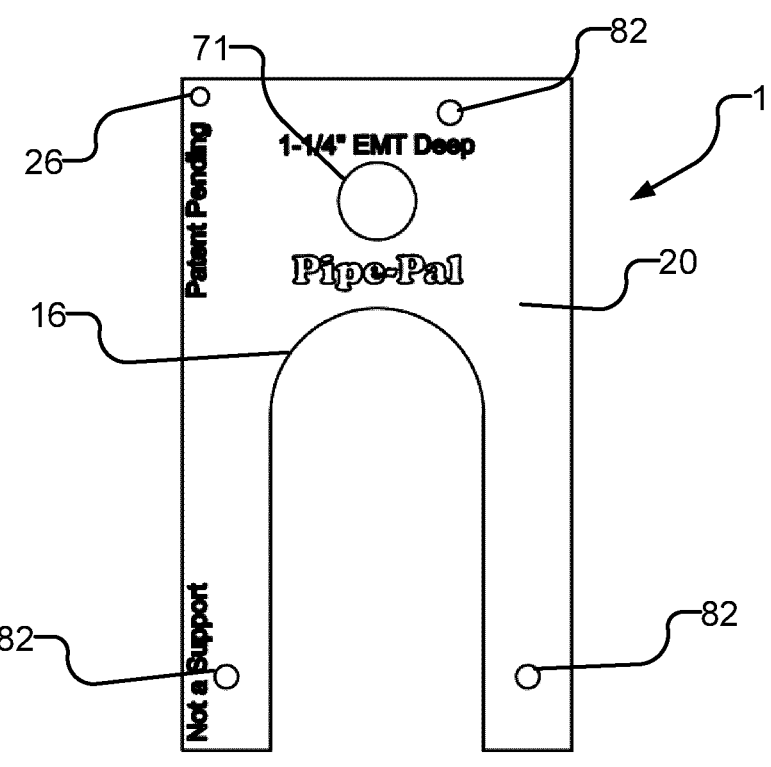
FIG. 7B is a front view of a conduit spacer tool according to an example embodiment of the invention.
Figure 7C:
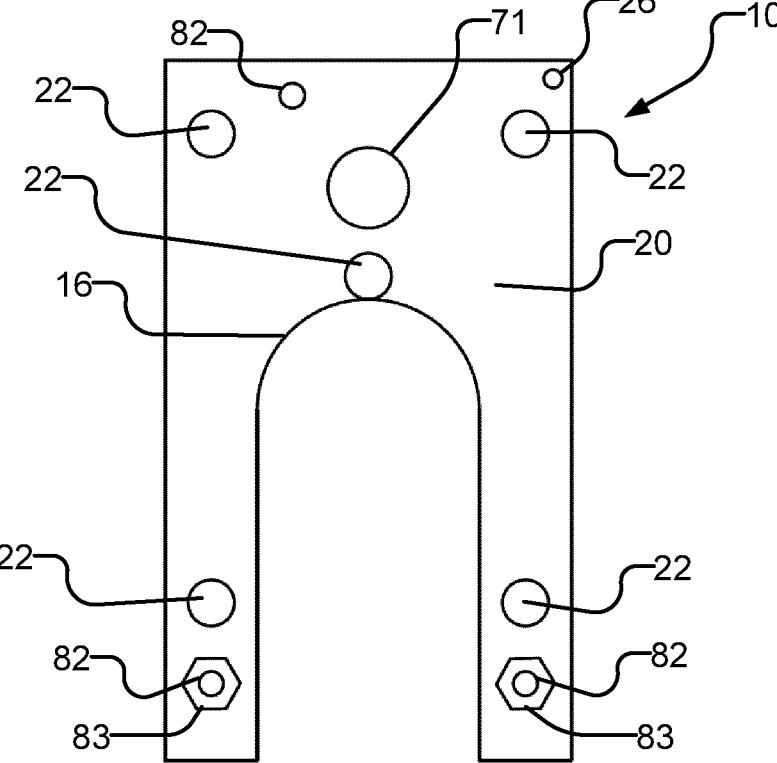
FIG. 7C is a rear view of the conduit spacer tool of FIG. 7B.

FIGS. 7B and 7C illustrate front and rear views of an example tool 10 configured to hold a mobile phone or other mobile electronic device. Example applications of such a tool 10 include supporting a phone that has a camera in a position such that the camera can transmit images or video to another location. For example, a user may clip a mobile phone to a tool 10 and support the tool 10 so that a camera of the phone views an area in which a laser spot from a laser 70 should be aimed. The user may view a video feed from the phone (e.g. on another phone, tablet etc.) while aiming laser 70 as described above.

Clips 80 may, for example, be coupled to body 20 of tool 10 with fasteners. In some embodiments a fastener passes through an opening 81 in clip 80 and a corresponding bore 82 in body 20 of tool 10. In some embodiments the fastener comprises a bolt. A corresponding nut may be recessed within a cavity 83 of body 20 (see e.g. FIG. 7C). Cavity 83 may prevent rotation or pivoting of a nut positioned within cavity 83.

Figure 7D:
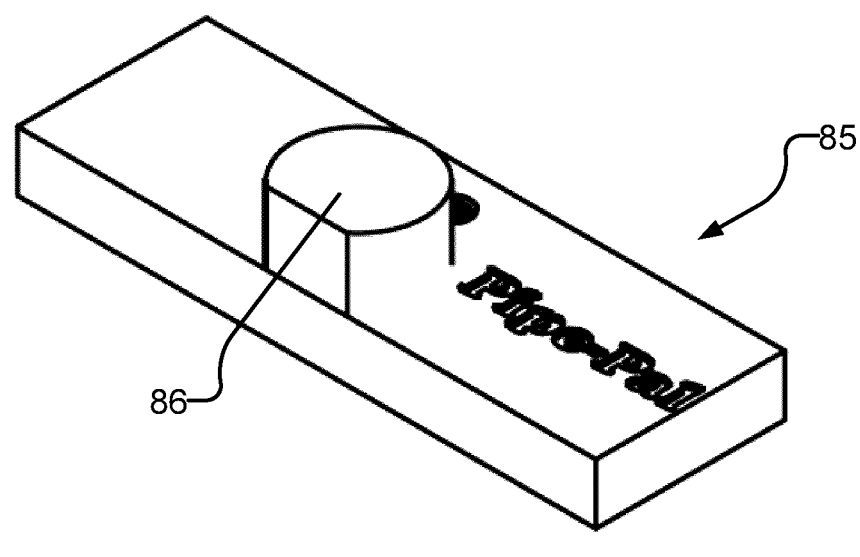
FIG. 7D is a perspective view of a magnetic block according to an example embodiment of the invention.
Figure 7E:
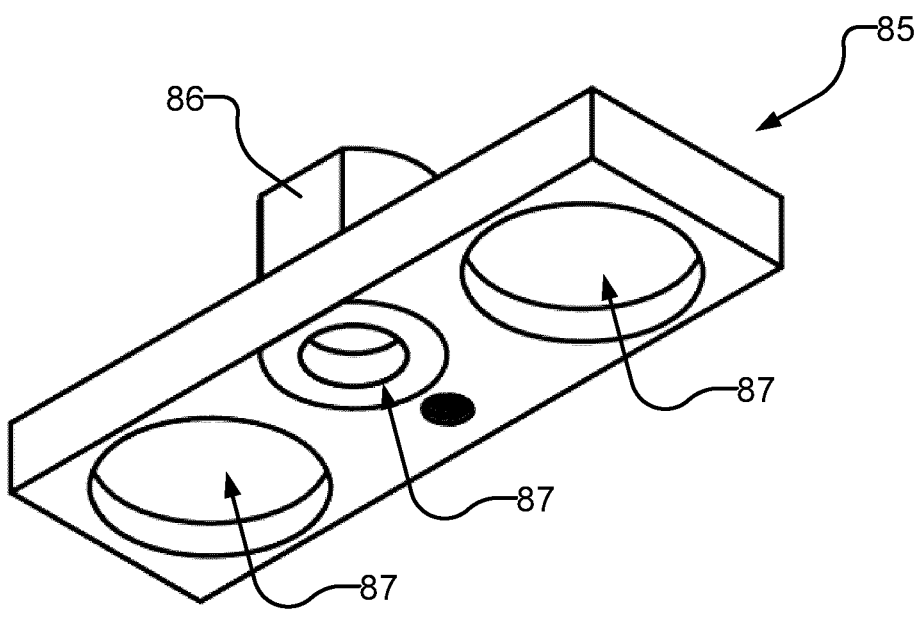
FIG. 7E is a bottom perspective view of the magnetic block of FIG. 7D.

Magnets 22 described elsewhere herein may not be strong enough alone to support the increased weight of the phone or other mobile electronic device (or may not even be included in some embodiments). In some embodiments a magnet block 85 (see e.g. FIG. 7D) comprising one or more magnets may be coupled to tool 10 to provide sufficient additional magnetic force for tool 10 to be held in a desired position. In some embodiments magnet block 85 is fastened to body 20. In some embodiments block 85 comprises a protrusion 86. Protrusion 86 may, for example, be inserted into bore 71 to form a friction fit thereby coupling magnet block 85 to body 20 of tool 10. In some embodiments block 85 is both fastened to tool 10 and protrusion 86 is inserted into bore 71. In some embodiments a bottom surface of magnet block 85 comprises one or more recesses 87 configured to receive magnets (see e.g. FIG. 7E).

Figure 8A:
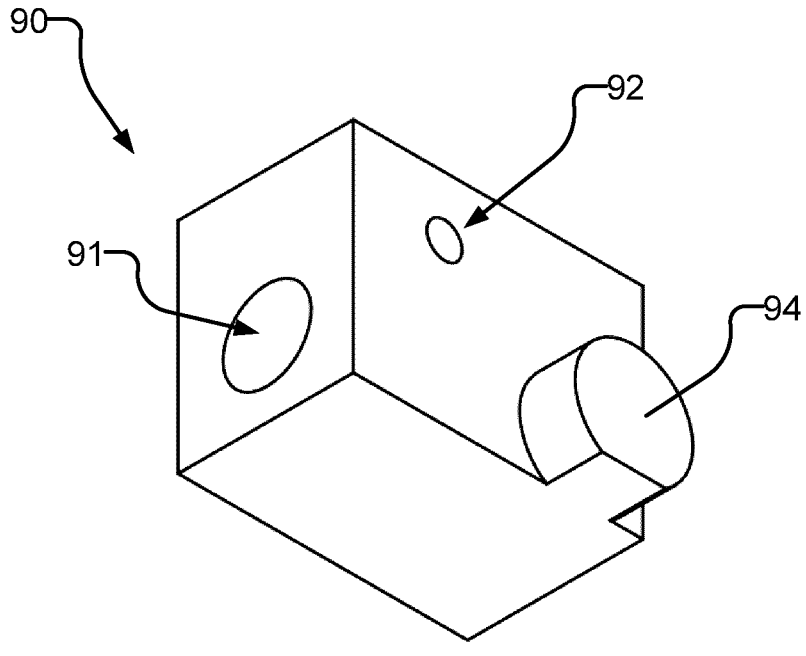
FIGS. 8A and 8B are perspective views of a block according to an example embodiment of the invention.
Figure 8B:
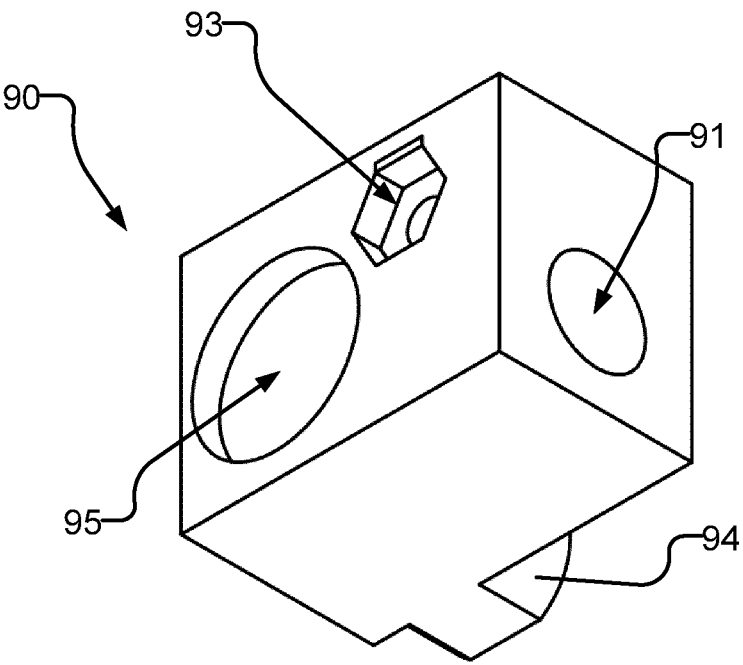

In some embodiments a block 90 (see e.g. FIGS. 8A and 8B) is coupled to tool 10. Block 90 may comprise one or more coupling points such as a cavity 91. Cavity 91 may provide a coupling point for one or more tools or parts commonly found at an electrical system installation site. For example, cavity 91 may comprise a cylindrical cavity. In some embodiments cavity 91 is threaded or a nut is positioned or inset within cavity 91. A threaded rod (e.g. a threaded ⅜ inch rod) may, for example, be inserted into cavity 91. The nut within cavity 91 may secure the threaded rod relative to cavity 91. Additional tools or parts may then be coupled to the threaded rod.

In some embodiments block 90 is fastened to body 20 of tool 10. For example, a fastener may pass through tool 10 and bore 92 of block 90. A nut may, for example, be received or inset within cavity 93. The nut may secure the fastener relative to block 90. In some embodiments block 90 comprises a protrusion 94. Protrusion 94 may be inserted into bore 71 of tool 10 to form a friction fit thereby coupling block 90 to body 20 of tool 10. In some embodiments block 90 is both fastened to tool 10 and protrusion 94 is inserted into bore 71.

In some embodiments block 90 comprises one or more magnets. The magnets may, for example, provide additional magnetic forces to hold tool 10 in position relative to one or more components of an electrical installation. In some embodiments magnets may be received within corresponding cavities 95.

Figure 9:
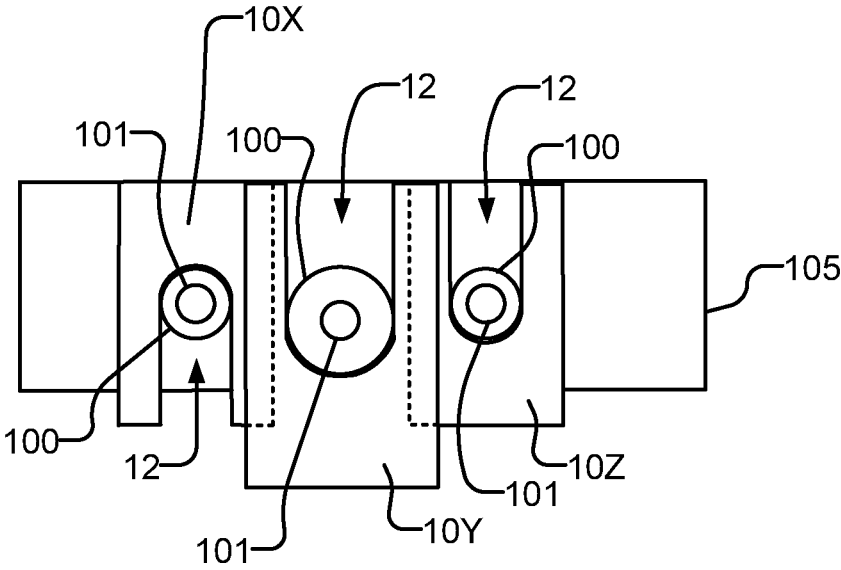
FIG. 9 is a schematic illustration of markers coupled with conduit spacing tools according to an example embodiment of the invention.

Marker guides 100 may be used with tools 10 to accurately mark locations such as the center line of a conduit. In some embodiments marker guides 100 may be positioned within slot(s) 12 of one or more tools 10 (e.g. tools 10X, 10Y, 10Z) as shown in FIG. 9. Each marker guide 100 may comprise a bore 101. Bore 101 is typically centered relative to marker guide 100. Different marker guides 100 may be different sizes. Bores 101 of different marker guides 100 may be different sizes. In some embodiments markers 100 are dimensioned to have at least partially a friction fit or slip fit within slots 12 of tools 10.

In some embodiments, each marker guide 100 comprises a circular body having a cylindrical outside surface having an outside diameter matched to the inside diameter of a slot 12 of a corresponding tool 10 such that the body of the marker guide 100 can be engaged within the slot 12 to have a fixed position relative to the slot 12. A bore 101 is centered in the circular body and dimensioned to receive a marker. The bore 101 may, for example, be dimensioned to receive and hold centered relative to the body the tip of a marker such as a round-bodied Sharpie™ marker.

A user may mark a position (e.g. a center position) by placing a marker (e.g. a writing instrument such as a pencil, an ink marker, etc.) through bore 101. The marked position may be used to position a drill bit for drilling a corresponding hole (e.g. drilling into a wall, drilling into a stud, drilling into an electrical box, etc.), may be used to mark a position of one or more connectors, etc. In some embodiments marker guide 100 comprises a cylinder having a height that is larger (e.g. at least ¹⁄₁₆th of an inch larger, at least ⅛th of an inch larger, etc.) than a thickness of a tool 10. Having a height that is larger than the thickness of a tool 10 may prevent a marker guide 100 from falling out of its corresponding slot 12 if two adjacent tools 10 are stacked (e.g. prevents marker guide 100 from slipping behind its tool 10 into a gap created by stacking tools 10).

FIG. 9 schematically illustrates a plurality of tools 10 (e.g. tools 10X, 10Y, 10Z) and corresponding example marker guides 100 positioned over a side of an example electrical box 105. In such example case, tool 10Y is partially stacked over tools 10X and 10Z. In such case a gap is present between tool 10Y and an adjacent wall of electrical box 105. A height of marker guide 100 inserted into slot 12 of tool 10Y is preferably larger than the thickness of tools 10X and 10Z to prevent the marker guide 100 from slipping into the gap formed between tool 10Y and electrical box 105.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a spacing tool, laser, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A kit comprising:
a first conduit spacer tool and a second conduit spacer tool, each of the first and second conduit spacer tools comprising:
a body comprising a pair of side arms that extend in a longitudinal direction, each side arm of the pair of side arms being dimensioned, in a width direction orthogonal to the longitudinal direction, to correspond to a designated spacing in the width direction between adjacent conduits; and
a slot defined between inner surfaces of the side arms, the slot terminating at a groove of the body and the slot having a width for receiving a conduit, the width of the slot in the width direction being dimensioned to correspond to a designated conduit diameter;
wherein when the conduit is fully received in the slot, the conduit has a center located at a in the center of the body in the longitudinal direction midway between the side of the conduit tool defined by ends of the pair of side arms most distal from the groove and an opposing side of the conduit tool; and
a laser, the laser couplable to the first and second conduit spacer tools.

2. The kit according to claim 1 wherein the laser is couplable to the first and second conduit spacer tools between the first and second conduit spacer tools.

3. The kit of claim 1 wherein at least one of the first and second conduit spacer tools comprises one or more magnets located at one or more of:
an end of one or both of the side arms;
the body on a side of the groove opposite from the pair of side arms; and
the body on a surface which defines the groove.

4. The kit of claim 3 wherein the one or more magnets are embedded in the body of at least one of the first and second conduit spacer tools.

5. The kit of claim 3 wherein the one or more magnets are removably attachable to one or more of the conduit and a strut channel to thereby maintain a position of at least one of the first and second conduit spacer tools relative to one or more of the conduit and the strut channel.

6. The kit of claim 1 wherein the body of at least one of the first and second conduit spacer tools has a length W+2L where W is the width of the slot and L is equal to a standard strut channel depth.

7. The kit of claim 6 wherein L is 0.75 inches, 1.25 inches or 1.625 inches.

8. The kit of claim 1 wherein the body of at least one of the first and second conduit spacer tools has a thickness in the range of ¼ to ¾ inches.

9. The kit of claim 1 wherein the body of at least one of the first and second conduit spacer tools is flat and has a thickness of less than ¾ inches.

10. The kit of claim 1 wherein the width of each of the side arms of at least one of the first and second conduit spacer tools is in the range of 0.5 to 2.5 inches.

11. The kit of claim 1 wherein the width of each of the side arms of at least one of the first and second conduit spacer tools is approximately ⅝ inches.

12. The kit of claim 1 wherein the body of at least one of the first and second conduit spacer tools has a total width equaling the sum of the widths of each of the pair of side arms and the width of the slot.

13. The kit of claim 1 wherein the body of at least one of the first and second conduit spacer tools comprises a hole penetrating a thickness of the body.

14. The kit of claim 1 wherein the body of at least one of the first and second conduit spacer tools is made from one of:

wood;

a polymeric material; and a metal.

15. The kit of claim 1 wherein at least one of the first and second conduit spacer tools comprises a bore, the bore configured to at least partially receive a laser.

16. The kit of claim 15 wherein the bore of at least one of the first and second conduit spacer tools has a diameter that forms a friction fit with the laser.

17. The kit of claim 15 wherein a center of the bore of at least one of the first and second conduit spacer tools is aligned with the center of the groove of the slot.

18. The kit of claim 1 wherein the first and second conduit spacer tools are coupled together with a ring.

19. The kit of claim 1 wherein, in use to secure a conduit to a strut channel, an open end of the slot of at least one of the first and second conduit spacer tools faces away from a structure to which the strut-channel is fixed.

*    *    *    *    *